United States Patent [19]

Koschatzky et al.

[11] 4,015,041

[45] Mar. 29, 1977

[54] UPHOLSTERY ARTICLES AND PROCESS FOR THEIR MANUFACTURE

[75] Inventors: Bruno Koschatzky; Attilio Angioletti, both of Milan, Italy

[73] Assignee: Industrie Pirelli S.p.A., Milan, Italy

[22] Filed: May 13, 1975

[21] Appl. No.: 577,049

[30] Foreign Application Priority Data

July 12, 1974 Italy .................. 25120/74

[52] U.S. Cl. .................. 428/310; 428/425
[51] Int. Cl.² .................. B32B 3/26
[58] Field of Search ......... 428/310, 311, 313, 314, 428/315, 423, 425; 264/45.5, 45.6, 48

[56] References Cited

UNITED STATES PATENTS

| | | | |
|---|---|---|---|
| 3,446,685 | 5/1969 | Goldstone et al. | 428/167 |
| 3,586,649 | 6/1971 | Cobbledick | 428/315 |
| 3,608,008 | 9/1971 | Sonkup | 264/45.5 |
| 3,644,168 | 2/1972 | Bonk et al. | 428/315 |

*Primary Examiner*—William J. Van Balen
*Attorney, Agent, or Firm*—Stevens, Davis, Miller & Mosher

[57] ABSTRACT

A molded cellular polyurethane upholstery article having a flexible inner cellular polyurethane core, a microporous polyurethane skin with predominantly closed cells is provided with a fabric reinforcing material between the skin and core over at least the load bearing portions of the article to improve its resistance to rupture, the fabric being a net having a resistance to perforation as measured by the sphere method, UNI Standard No. 5421-64 of not smaller than 8 kg, and a thickness comprised between 20 and 100 meshes per dm.

1 Claim, No Drawings

UPHOLSTERY ARTICLES AND PROCESS FOR THEIR MANUFACTURE

This invention relates to an improvement in upholstery articles of cellular polyurethane provided with a preformed outer layer, or skin, of polyurethane material and to the process for making it described in U.S. Pat. No. 3,847,720, copending U.S. Pat. applications Ser. No. 445,945 filed Feb. 26, 1974 and Ser. No. 322,844 filed Jan. 11, 1973 and application Ser. No. 251,683 filed May 9, 1972, now abandoned, the disclosures of said patent and applications being incorporated herein by reference.

A molded upholstery article of cellular polyurethane is disclosed in U.S. Pat. No. 3,847,720. This product has an inner core of cellular polyurethane material, a preformed dense polyurethane skin, and characterized in that the skin, which is microporous and is intimately joined to the inner core, has predominantly closed cells uniformly distributed in its thickness, for the most part not communicating with one another, and with a diameter smaller than 0.02 mm, and practically continuous, water-impermeable visible surface, and in that the value of its density ranges between 0.4 and 0.8 g/cm$^3$.

The process disclosed in the patent involves applying inside the mold a thin layer of a first liquid mixture of reacting substances capable of forming a self cross-linked microporous polyurethane layer forming the skin of the article and, immediately after the application of the liquid mixture, in pouring in the mold so coated a second liquid mixture of reaction substances capable of forming the core of flexible self cross-linked cellular polyurethane of the article, without applying external heat during the whole process.

Application Ser. No. 251,683 filed May 9, 1972 discloses an upholstery article, in particular a cellular polyurethane cushion for seats or backs, provided with a covering of fabric only in the central portion of its useful surface. In accordance with the process disclosed in this application, a liquid impervious fabric is positioned in a mold, a layer of a liquid mixture is applied over the fabric which will react to form a microporous polyurethane skin, and a second liquid is poured over the first which will react and expand to form a self cross-linked polyurethane foam to fill the mold and form the core of the upholstery article.

An upholstery article, in particular a cushion for seats or backs, provided at the portion of the microporous skin which serves as its useful surface with a very thin outer layer of compact and pigmented polyurethane which confers to that portion of the article a high degree of slipperiness is disclosed in application Ser. No. 322,844 filed Jan. 11, 1973. The process disclosed in the application involves applying on particular zones of the mold, before the introduction of the first liquid mixture forming the microporous skin, a solution of a mixture of reacting substances capable of forming a compact polyurethane, in an amount sufficient to obtain a very thin layer of the material, which sets during the reactions of the first and of the second mixture.

An upholstery article, in particular a cushion for seats or backs having a piece of fabric situated on the portion of the surface intended to support the user is disclosed in Italian application No. 28,660 A/72, the disclosure of which is incorporated herein by reference. The fabric is connected to the inner core of the article through an intermediate assembly, of which the fabric is the visible surface. In addition to the piece of fabric, the assembly comprises a layer of flexible cellular polyurethane material and a layer of reinforcing fabric, the latter being intimately joined to the inner core, so that the piece of fabric is permeable both to air and to water vapor. The process disclosed in this Italian application involves applying to the bottom of the mold, or on a part of it, the above defined assembly in such a way that the piece of fabric comes into contact with the mold surface.

The preformed skin of microporous cellular polyurethane of the molded upholstery article as described in U.S. Pat. No. 3,847,720 and in the above identified patent applications can be provided with ribs or reliefs reproducing the seams of the upholstery articles made of leather by known processes. The ribs or reliefs are imparted to the article by molding, using a mold having the corresponding pattern in negative.

It has been noted that the so obtained upholstery article, although it is quite acceptable as regards its aesthetical appearance and its function, has the disadvantage that, at the ribs, it may have a low resistance to concentrated loads. This can result in ruptures in the skin. Consequently, there is a prejudice against the article from the point of view of its function.

An object of the present invention is to provide a molded upholstery article of the kind disclosed in the aforesaid patent and patent applications which is devoid of the foregoing disadvantage. Another object of the invention is to provide a cellular polyurethane upholstery article having a microporous skin and having improved resistance to rupture under load in rib areas.

The foregoing objects are accomplished in accordance with the invention by providing a molded upholstery article of cellular polyurethane, in particular a cushion for seats and backs in general, of the kind disclosed in U.S. Pat. No. 3,847,720 and the aforesaid patent applications characterized in that at least a part of the surface of the microporous skin, in particular the useful surface of a cushion, and/or the useful surface of the back thereof, is internally supported by a piece of net fabric of natural, artificial and/or synthetic fibers having a value of resistance to perforation measured according to the sphere method (UNI Standard No. 5421-64), of not smaller than 8 kg, and a thickness comprised between 20 to 100 meshes per dm.

The invention also provides a process for making such upholstery articles characterized in that, immediately after having applied on the mold the first liquid mixture of reaction substances capable of forming a layer of skin of self cross-linked microporous polyurethane, and before pouring in the mold so coated the second liquid mixture of reacting substances capable of forming the self cross-linked cellular polyurethane intended to form the inner core of the article, a piece of net fabric of natural, artificial and/or synthetic fibers, having a value of resistance to perforation measured according to the sphere method (UNI Standard No. 5421-64) not smaller than 8 kg and a thickness between 20 and 100 meshes per dm is positioned on at least a part of the first mixture.

The piece of net fabric used in accordance with the present invention to support internally the microporous skin of the upholstery article can be made of cotton, rayon, polyamide or polyester, polyvinyl alcohol fibers; preferably, a net fabric of polyamide (nylon) fibers is used.

As indicated above, the piece of fabric must have a value of resistance to perforation not smaller than 8 kg, measured in accordance with UNI Standard No. 5421-64 with a sphere having a diameter of 15 mm.

Further, the fabric must be sufficiently sheer not to hinder the intimate union of the foam with the skin of microporous polyurethane upon the formation of the polyurethane foam which is to be the inner core of the article or to interfere with the formation of the microporous skin, which as disclosed in the aforesaid patent, is controlled by the heat produced in the formation of the polyurethane foam. In the practice, a net fabric is used, having a thickness comprised between 20 and 100 meshes per dm, preferably from 30 to 50.

The upholstery article provided by the present invention is made, as said above, by positioning the piece of fabric on the layer of the first liquid mixture applied on the mold, and immediately after the application of the first mixture; once having positioned the piece of fabric, having such dimensions as to cover the whole layer, or at least the surface of the layer in correspondence of which a concentration of loads during use is foreseen, the second polyurethane mixture intended to form the inner core of the article is poured.

The second mixture is poured immediately after the positioning of the piece of fabric on the layer of the first mixture, and in any case without waiting for the components of the first mixture to react completely and set into a formed layer, analogously to what is foreseen in the process according to the said patent.

It has been found that the presence of the piece of net fabric having the above defined value of resistance to perforation is sufficient to make the upholstery article extremely resistant to concentrated loads.

The following table reports the results of the two series of tests carried out for this purpose, providing, in accordance with the present invention, a seat for motor vehicles in which the useful surface of the cushion, made of skin of microporous polyurethane was supported, for each series of tests, by a net fabric of polyamide fibers having, respectively, a resistance to perforation of 8 kg and 19 kg. In particular, the first fabric used was made of polyamide fibers having a count equal to 45 dTex and a thickness of 50 meshes per dm, while the second fabric was made of polyamide fibers having a count equal to 235 dTex and a thickness of 30 meshes per dm.

|  | Thickness (meshes per dm) | Fabric Count (dTex) | Resistance to perforation (kg) | Resistance to perforation of cushion useful surface (kg) |
|---|---|---|---|---|
| 1st seat | 50 | 45 | 8 | 15 |
| 2nd seat | 30 | 235 | 19 | 20–21 |

As can be noted from the obtained results, the resistance to perforation of the useful surface of the cushion of the seat internally supported by the two different types of fabric used is higher than the inherent resistance of the fabric itself.

Moreover, deformation under compression tests were carried out on the seats of motor vehicles formed as described above, by using for this purpose a device of anatomical form which subjected the article to deformation by compression at a frequency of 15,000 cycles per hour.

It was ascertained that the upholstery article provided with the skin of microporous polyurethane supported internally in this way is able to withstand up to 1,500,000 cycles, while the analogous article, not provided with the piece of fabric, does not exceed sometimes 500,000 cycles.

As the invention has been described only by way of non-limiting example, it is to be understood that it includes in its scope of protection any modifications to its whole and to its particulars which are derived from the basic concepts on which the invention is based.

What is claimed is:

1. In a molded cellular polyurethane upholstery article comprising an inner core of flexible cellular polyurethane and a preformed flexible polyurethane skin which is mechanically resistant and which presents an appealing appearance, wherein said skin is microporous and is directly joined to the inner core by a chemical bond, has cells substantially uniformly distributed within its thickness in a fine cellular structure, said cells being predominantly cells which do not communicate with each other, and skin having a density between 0.4 and 0.8 g/cm$^3$, the improvement consisting in that at least the useful surface of said skin is internally supported by a piece of net fabric made of fibers selected between natural, artificial and synthetic fibers disposed in the said article between said skin and said inner core, said net fabric having a resistance to perforation as measured by the sphere method, UNI Standard No. 5421-64 of not smaller than 8 kg and a thickness comprised between 20 and 100 meshes per dm.

* * * * *